United States Patent [19]

Shacklette et al.

[11] Patent Number: 4,462,929
[45] Date of Patent: Jul. 31, 1984

[54] SOLUTION OF A CHALCOGEN-CONTAINING POLYMER IN ACIDS AND PROCESS OF FORMING POLYMER ARTICLES THEREFROM

[75] Inventors: Lawrence W. Shacklette, Maplewood; Granville G. Miller, Morristown; Jane E. Frommer, Mendham Township, Somerset County, all of N.J.

[73] Assignee: Allied Corporation, Morris Township, Morris County, N.J.

[21] Appl. No.: 432,043

[22] Filed: Sep. 30, 1982

[51] Int. Cl.³ .............................................. H01B 1/06
[52] U.S. Cl. .................................... 252/518; 252/500; 524/401; 524/609
[58] Field of Search ................ 252/518, 500; 524/401, 524/609, 404, 408, 409, 411, 412, 414, 418

[56] References Cited

U.S. PATENT DOCUMENTS 3,775,177 11/1973 Hayama et al. ..................... 252/518

FOREIGN PATENT DOCUMENTS 1000679 8/1965 United Kingdom .

Primary Examiner—Josephine Barr
Attorney, Agent, or Firm—Alan M. Doernberg; Gerhard H. Fuchs; Kenneth E. Stroup

[57] ABSTRACT

A polymer solution is formed from a sulfur- or oxygen-containing aromatic polymer solute such as poly(phenylene sulfide) or poly(phenylene oxide), a Lewis Acid solute derivative (dopant) such as arsenic hexafluoride and a strong acid solvent such as sulfuric acid. Solvents such as fluorosulfonic acid may also serve to generate the dopant. The solutions are especially useful for casting polymer articles.

9 Claims, No Drawings 4,462,929

SOLUTION OF A CHALCOGEN-CONTAINING POLYMER IN ACIDS AND PROCESS OF FORMING POLYMER ARTICLES THEREFROM

DESCRIPTION

Background of the Invention

The present invention relates to polymer solutions containing a sulfur-containing aromatic polymer, methods of forming such solutions and methods of using such solutions to form polymer articles including films.

Conductive poly(p-phenylene sulfide) and other chalcogenide polymers rendered conductive by doping with a Lewis Acid halide and other dopants are disclosed in European published patent application No. 31,444 (July 8, 1981) the subject matter of which is included in U.S. Pat. No. 4,375,427 to Miller et al. (1982). Such materials are prepared, in some forms, by introducing a gaseous dopant into the solid polymer pellet.

In the general field of conducting polymers, such as polyphenylene, polyphenylene sulfide, polypyrrole and polyacetylene, it has been heretofore believed impossible to dope one of these polymers to the extent that it becomes a semiconductor or conductor and thereafter dissolve the polymer. In the absence of such solutions, the ability to form certain articles out of conducting polymers, and especially conducting or semiconducting polymer films, is restricted. In particular, doping with a gas after forming a polymer article is known to expand or distort the polymer article. Thus a need exists for techniques to facilitate the production of conductive polymers, to facilitate the doping process and, especially, to form shaped articles such as films and fibers of conducting polymers.

Frommer, Elsenbaumer and Davidson, in commonly-assigned U.S. patent application Ser. No. 393,010 filed June 28, 1982, now abandoned, describe solutions of polymers such as poly(p-phenylene sulfide) with dopant anions such as arsenic hexafluoride in metal halide solvents such as arsenic trifluoride, the use of such solution in casting conductive articles and the conductive properties of the solutions themselves.

BRIEF DESCRIPTION OF THE INVENTION

It has been discovered that poly(p-phenylene sulfide), poly(p-phenylene oxide) and similar chalcogen-linked aromatic polymers dissolve in certain strong acids when doped by electronic acceptor doping agents to form a solution useful for casting films and other polymer articles with conductivities in the range of $10^{-12}$ to $10^{-2}$ S/cm. Accordingly, the present invention includes a polymer solution comprising (a) a solvent which is at least one strong acid selected from the group consisting of sulfuric acid, fluorosulfonic acid, chlorosulfonic acid, perfluoroalkylsulfonic acids, perchloric acid, hydrogen chloride and hydrogen fluoride; (b) a solute cation derived from oxidation of a polymeric solute comprising aromatic moieties directly linked by divalent, trivalent or tetravalent sulfur or by divalent oxygen; and (c) a dopant solute comprising a halide or oxyhalide anion of a group IIIA, IIIB, IVA, IVB, VA, VB, VIIIA or VIB metal or metalloid, or a halide or exhalide anion of phosphorus, selenium, sulfur or boron, or is the product of the reduction of a reducible strong acid or sulfur trioxide by the polymeric solute or other reductant.

The present invention also includes a method of forming such solutions by dissolving said polymer solute and said dopant solute, either separately or in combination as an acceptor doped polymer, in said solvent. The invention further includes a method of forming a polymer article which comprises the steps:

(a) forming the above solution, and
(b) removing from the solution the solvent together with any excess Lewis Acid halide beyond that absorbed by the polymer solute as the polymer solute solidifies. The process is capable of forming polymer articles (which may be conductive in certain instances) of various shapes, with a low degree of porosity and good mechanical properties by non-melt processing conditions.

DETAILED DESCRIPTION OF THE INVENTION

The polymer used in the present invention may be any of the materials described in the above-referenced EPA No. 234,511, and may especially be any structure with substituted or unsubstituted aromatic moieties such as p-phenylene, m-phenylene, naphthalene, methyl-1,4-phenylene, linked directly by sulfur either in the form of sulfide linkages, in trivalent forms such as —RS— where R is alkyl, in tetravalent forms such as —S(=O)— or in the form of heterocyclic moieties containing divalent ring sulfurs or by divalent oxygen. It is contemplated that some aromatic rings may be linked directly by carbon-carbon covalent bonds while others are linked by sulfide; that some aromatic moieties will be linked by sulfide while others are linked by heterocyclic moieties; that some aromatic moieties are linked by sulfide while others are linked by trivalent or tetravalent sulfur (e.g. sulfoxy). Examples of suitable heterocyclic moieties include thiophenes and substituted thiophenes such as methyl thiophene and dimethyl thiophene. Thus representative polymers suitable for use in the present invention include poly(p-phenylene sulfide), poly(m-phenylene sulfide), poly(p-phenylene oxide), poly[4,4'-thio(1,1'-biphenyldiyl)], poly [4,4'-thio(diphenyl sulfoxide)], poly(paraphenoxyphenyl sulfide), poly(-para-phenylene disulfide), poly(4-sulfinylphenyl), poly(thio-2,8-dibenzothiophendiyl) and poly(thio-3,7-dibenzothiophendiyl).

The dopant solute used in the present invention may be the product of any of the Lewis Acid halides or oxyhalides used as electron-acceptor dopants in the preparation of conductive polymers based upon polyphenylene, polyphenylene sulfide, polyacetylene or polypyrrole. Examples of such dopants include solutes generated by employing as reactant the neutral halides represented by arsenic pentafluoride, antimony pentafluoride, antimony pentachloride, molybdenum pentachloride, and molybdenum oxytetrachloride or peroxides such as $(CF_3—SO_3)_2$ or $(FSO_3)_2$. Also included are the solutes generated by employing as reactant superoxidant salts such as the nitronium, nitrosonium and dioxygenyl salts of hexafluoroarsenate, hexafluoroantimonate, hexafluorophosphate and tetrafluoroborate. Since, in the present invention, the polymer may be doped with the dopant immediately prior to contact with the solvent, the dopant solute may also be an anion introduced electrochemically into the polymer in the manner described by MacDiarmid et al. in U.S. Pat. No. 4,321,114 (Mar. 23, 1982). In addition, the electrochemical doping may be conducted in the presence of the strong acid solvent, such as by use of a salt in HF, in sulfuric acid or in trifluoromethanesulfonic acid. Thus, for example, the polymer (e.g. poly(phenylene sulfide)) may be electrochemically doped by the anions of various salts including hexafluoroarsenates, hexafluoroantimonates, hexafluorophosphates, tetrafluoroborates, tetrachloroaluminates, trifluoromethanesulfonates and fluorosulfonates.

The dopant solute may also be the product of the reduction of a reducible strong acid by the polymer solute. For example, if excess fluorosulfonic acid ($HSO_3F$) is reacted with poly(phenylene sulfide) the fluorosulfonic acid can act as both dopant source and solvent. The byproduct anion (believed to be $FSO_3^-$) acts as the counterion for the polymer cation. It is believed that reaction with peroxides, as described above, will produce similar dopant solute anions.

The solvent can be any of the conventional "superacids" which are a single compound or group of compounds. These include concentrated sulfuric acid, flluorosulfonic acid, chlorosulfonic acid, perfluoroalkyl sulfonic acids (such as trifluoromethanesulfonic acid) and anhydrous perchloric acid. The solvent can also be a mixed system which forms a superacid such as HF with arsenic or antimony pentafluoride, sulfuric acid with sulfur trioxide, HCl with $MoCl_5$ or can be a mixture of superacids. In the case of HF as solvent, some oxidizing dopant precursor (such as arsenic or antimony pentafluoride) may be required to make it a sufficiently strong acid to dissolve the doped polymer. Based upon a single experiment, HF in the presence of only limited amounts of arsenic pentafluoride appears not to dissolve poly(p-phenylene sulfide). HCl is believed to be similar. The solvent and dopant precursor should not normally be reactive with each other (such as arsenic pentafluoride with HCl) in a reaction producing inactive reagents or in degrading the polymer.

The proportions of polymer, dopant and solvent are not particularly critical, but the following guidelines are believed important for achieving solutions particularly useful in the present invention. First, some minimum degree of doping of the polymer is believed necessary to achieve reasonable solubility in the solvent. In the case of arsenic pentafluoride as dopant, poly(p-phenylene sulfide) as polymer and sulfuric acid as solvent, Example 4 illustrates a technique wherein this minimum degree of doping can be determined. In general, the treatment of a relatively large quantity of polymer with a relatively low level of dopant gas, in the presence of the solvent liquid, will dissolve only a part of the polymer. By measuring the quantity of polymer being doped and entering solution (either by measuring the quantity of residual polymer or measuring the quantity of an article cast from the solution), the approximate minimum dopant/polymer ratio can be determined. It is believed that a similarly determined minimum will exist at any solution temperature for each combination of polymer, dopant and solvent, which minimum can be determined by routine experimentation.

The amount of solvent as a proportion of the amount of polymer is not believed to be critical, since any amount of solvent as a liquid will form at least a viscous gel with highly doped polymer. It is preferred, however, to use sufficient liquid solvent to lower the viscosity of the gel or solution to a point where it flows at least sufficiently to conform to a container shape or mold in a reasonably short period (e.g. in 30 minutes or less). Preferably, the solvent is present in sufficient amounts to lower the viscosity to less than about 10,000 poise, more preferably between about 1 to 1,000 poise.

In addition to the polymer, the dopant and the solvent, fourth components may also be present which either dissolve or do not dissolve in the solution. In the case of dissolvable components, materials may be present which alter the physical or mechanical properties of either the solution or the article eventually cast from the solution. Examples of such materials include phenylene oligomers, phenylene sulfide oligomers, phenylene oxide oligomers, polyethylene oxides and glymes. In the case of non-soluble fourth components, materials may be present which either fill or form a substrate for the conductive polymer cast from the solution. These fourth components include other conductive polymers, other polymers such as polyacetylene which may become conductive upon doping, graphite, metal conductors, reinforcing fibers and inert fillers (such as clays and glass).

One preferred method of forming the present solutions is to react, simultaneously, the polymer, the dopant and the solvent as a liquid. Thus, for example, by introducig poly(p-phenylene sulfide) as a solid powder, arsenic pentafluoride as a gas and trifluoromethanesulfonic acid as a liquid into a mixing vessel, a solution is quickly formed, from which articles of moderate conductivities can be cast. The conditions of such mixing are not critical, provided that good wetting of the polymer occurs.

An alternate technique is to mix first the polymer and the solvent, which in most cases will remain as a two-phase system almost indefinitely. Thus, for example, if poly(p-phenylene sulfide) powder is admixed with sulfuric acid liquid, the powder will remain on or suspended in the solution for extended periods under normal conditions. The addition of a dopant, such as arsenic pentafluoride gas, causes the powder to be doped and, almost instantaneously thereafter, causes the doped polymer to go into solution.

A suitable, but somewhat less preferred method of forming the solution, is to prereact the dopant with the polymer before introducing solvent. Thus, for example, if polyphenylene sulfide, either in powder, pellet or film form, is reacted with arsenic pentafluoride gas, it will dope so as to become a conductive polymer. If the solvent (e.g. sulfuric acid) is introduced soon after the polymer is rendered conductive, it may dissolve the doped polymer at least in part. If, however, the conductive polymer is allowed to stand for substantial periods at room temperature prior to introduction of the solvent (as in Example 6), it will change in some fashion so as to be less soluble. While applicants do not wish to be tied to a particular theory, it is possible that the doped polymer crosslinks upon standing and that the cross-linked conductive polymer is less soluble in the solvent than the freshly doped polymer. It is believed that similar phenomena will occur for various combinations of polymer and dopant within the scope of the present invention, if allowed to stand for any appreciable period prior to introduction of the solvent. This may be avoided, somewhat, if the doped polymer is maintained at extremely low temperatures prior to introducing the solvent.

Various methods are contemplated for using the solution of the present invention. First, it is contemplated to remove the solvent and excess dopant precursor (e.g. arsenic pentafluoride), if present, from the solution. The solvent is removed preferably by evaporation (when a volatile solvent is used), but alternatively by extraction with an extractant in which the solvent and dopant precursor are substantially more soluble than the doped polymer. If a polymer article of low conductivity (primarily ionic conductivity) is desired, the polymer can be precipitated by adding an electron donor agent such as water or ammonia, which will cause the polymer to precipitate. As will be appreciated by those skilled in polymer processing, the ability to form polymer articles by removing a solvent from a solution enables one to prepare articles of a wide variety of shapes and sizes. Thus, for example, by removing volatiles from the present solution spread on a surface, films of any desired thickness can be prepared. By extruding the solution through a die, fibers or films can be made. Similarly, by removing volatiles from the solution in a mold of various shapes, shaped articles conforming in shape to the mold can be prepared. It will be appreciated that some shrinkage might occur between the solution in its last flowable state to the final article, but such shrinkage is conventionally accounted for in molding polymers from solutions. It is also contemplated that, once a solution is formed, a partial or substantial removal of solvent will occur prior to placing the solution on a surface or in a mold, with the final venting of solvent occurring on the surface or in the mold. It is contemplated that, if fourth or additional soluble components are introduced into the solution, they will, unless also volatile, be present in the shaped article formed. If the fourth component is a non-volatile liquid, then the removal of volatile components may leave a new liquid form of doped conducting polymer.

In the event that fourth or additional nonsoluble components are present (or suspended) in the solution, the doped polymer will form around, or be filled with, the insoluble material. If, for example, the additional components are fibers, the relative amounts of fibers and doped polymer remaining will cause either the polymer to be fiber-filled, the fibers to be polymer impregnated or some intermediate composite of fibers and doped polymer to be formed. In the case of systems wherein the amount of non-soluble component greatly exceeds the doped polymer remaining, individual particles or shapes of non-soluble component coated or impregnated with doped polymer will be formed. Examples of articles formed from non-soluble components and the present polymer solutions include conductive housings for sensitive electronic equipment (microprocessors), infrared and microwave absorbing shields, flexible electrical conducting connectors and switches, conductive bearings and brushes, semiconducting photoconductor junctions and antistat coatings.

It is also contemplated to use the present solutions as such as liquid semiconductors (e.g. in liquid solar cells) or switches depending upon the conductivity of the doped solution.

A fourth application for the present polymer solutions is in the doping of other materials, and especially other conjugated backbone polymers which could also be doped by the electron-acceptor dopant alone. Such doping may occur as a part of the process of casting onto the second polymer substrate to be doped, but may also be accomplished without, necessarily, casting the conductive polymer from the solution.

EXAMPLE 1

Virgin PPS powder (Ryton TM, V-1 grade) (approx. 0.5 g) was placed in a 50 mL glass vessel. Approximately 15 mL of fluorosulfonic acid ($FSO_3H$) was added with stirring under a nitrogen atmosphere. The PPS immediately formed a dark blue-green solution of low viscosity. The glass vessel was then evacuated for 1.5 hours during which time the solution became more and more viscous until finally a clear flexible dark green film. This film was removed in an argon-filled dry box and its dc conductivity was measured by a 4-probe apparatus as $6 \times 10^{-3}$ S/cm.

EXAMPLE 2

PPS and $FSO_3H$ were combined as in Example 1 to form a solution. This solution was placed on a vacuum line and partially evacuated to remove all vapors except those of $FSO_3H$. Then the stirring solution was exposed to $AsF_5$ at a pressure of 400 torr (53 kPa). Heat was evolved and the solution changed color from blue-green to royal blue. Volatiles were then removed as before and a film was cast. This film had a conductivity of $8 \times 10^{-3}$ S/cm.

EXAMPLE 3

PPS and trifluoromethane sulfonic acid ($CF_3SO_3H$) obtained from Eastman Kodak were combined as in Example 1. The PPS showed only a small degree of solubility (while stirring the solution gradually took on a darker green coloration). At this point, the vessel containing the solution was placed on a vacuum line and $AsF_5$ was added as in Example 2. The remaining insoluble polymer quickly dissolved and the solution turned dark blue. A film cast from this solution had conductivity, $1 \times 10^{-3}$ S/cm.

EXAMPLE 4

PPS was added to concentrated sulfuric acid (98%) and displayed very low solubility, the liquid phase taking on a very light green coloration. When $AsF_5$ was added, the PPS readily dissolved forming a dark blue solution.

EXAMPLE 5

PPS was added to fuming sulfuric acid (15 to 18%) and immediately formed a dark blue solution. Several grams of PPS were then added to form a concentrated viscous solution. Some of this blue solution was then poured on a water surface whereupon a translucent, beige film was cast at the surface.

EXAMPLE 6

PPS was placed in a vessel, evacuated and cooled to $-78°$ C. $AsF_5$ was condensed into the vessel at this temperature. The PPS was allowed to dope by standing in the liquid $AsF_5$ overnight. There was no evidence for solubility of doped PPS in liquid $AsF_5$ at these temperatures. Fluorosulfonic acid was condensed into the vessel at $-78°$ C. and the vessel was warmed to room temperature. The doped PPS which now appeared as a black powder did not show any solubility. This behavior contrasts with that of Example 2 where $AsF_5$ was added last and the PPS already dissolved in $FSO_3H$ remained in solution after $AsF_5$ addition. The $AsF_5$-doped PPS was then compensated with $NH_4OH$ and washed to extract the dopant from the polymer. This extracted PPS was then added to $FSO_3H$ and $AsF_5$ exactly as in Example 2. In this case no solubility of the redoped polymer was observed. Evidently, doping PPS in the solid state leads to an irreversible change in the polymer which renders it subsequently insoluble.

EXAMPLE 7

PPS powder (about 0.75 g) was placed in a glass vessel which contained two platinum electrodes. About 10 ml of trifluoromethane sulfonic acid was distilled into this vessel at $-196°$ C. Upon warming to room temperature, the PPS again showed limited solubility as in Example 3. The vessel was pressurized with nitrogen gas to atmospheric pressure. Any overpressure was relieved through a silicon oil-filled bubbler. The solution was then electrolyzed by passing a 10 mA current between the platinum electrodes. A noncondensible gas (presumably hydrogen) was observed to evolve from the cathode. The process at the anode is presumed to be either the oxidation of $CF_3SO_3^-$ to its peroxide, which will act to dope the polymer, or else the direct oxidation of the polymer to its doped state. In any case, the polymer was observed to steadily dissolve as current was passed. The polymer was fully dissolved after approximately 120 coul had passed. This charge corresponds to about 0.17 electrons per monomer unit (i.e. 17% doping). A total of 220 coul was eventually passed. The remaining solvent was removed by evacuation and a film was cast which had a conductivity of about $4 \times 10^{-4}$ S/cm.

EXAMPLE 8

Powdered poly(p-phenylene oxide), PPO, was placed in a glass vessel as in Example 1. The vessel was evacuated and fluorosulfonic acid was distilled onto the PPO at $-196°$ C. Upon warming to room temperature, the PPO dissolved to form a dark brown colored solution. The acid was then removed by evacuation and a brown film was cast. This film had a conductivity with a partly ionic component. The net conductivity was $5 \times 10^{-4}$ S/cm.

What is claimed is:

1. A polymer solution comprising:
   (a) a solvent which is at least one strong acid selected from the group consisting of sulfuric acid, fluorosulfonic acid, chlorosulfonic acid, perfluoroalkylsulfonic acids, perchloric acid, HF and HCl;
   (b) a solute cation derived from oxidation of a polymer solute comprising aromatic moieties directly linked by divalent, trivalent or tetravalent sulfur or by divalent oxygen and
   (c) a dopant solute comprising a halide or oxyhalide anion of a group IIIA, IIIB, IVA, IVB, VA, VB, VIIIA or VIB metal or metalloid or a halide or oxyhalide anion of phosphorus, selenium, sulfur or boron or is the product of the reduction of a reducible strong acid or of sulfur trioxide by said polymeric solute.

2. The polymer solution of claim 1 wherein said polymer is poly(phenylene sulfide).

3. The polymer solution of claim 2 wherein said polymer is poly (p-phenylene sulfide).

4. The polymer solution of claim 1 or 2 or 3 wherein said solvent is fluorosulfonic acid and said dopant solute is the anion derived from fluorosulfonic acid.

5. The polymer solution of claim 1 or 2 or 3 wherein said solvent is a perfluoroalkylsulfonic acid.

6. The polymer solution of claim 5 wherein said perfluoroalkylsulfonic acid is trifluoromethylsulfonic acid.

7. The polymer solution of claim 1 or 2 or 3 wherein said dopant solute anion is derived from a Group VA pentahalide.

8. The polymer solution of claim 7 wherein said Group VA pentahalide is a Group VA pentafluoride.

9. The polymer solution of claim 8 wherein said Group VA pentafluoride is arsenic pentafluoride.

* * * * *